United States Patent
Harrison et al.

(10) Patent No.: US 9,013,452 B2
(45) Date of Patent: Apr. 21, 2015

(54) METHOD AND SYSTEM FOR ACTIVATING DIFFERENT INTERACTIVE FUNCTIONS USING DIFFERENT TYPES OF FINGER CONTACTS

(71) Applicant: Qeexo, Co., San Jose, CA (US)

(72) Inventors: Christopher Harrison, Pittsburgh, PA (US); Julia Schwarz, San Jose, CA (US); Robert Bo Xiao, Saskatoon (CA)

(73) Assignee: Qeexo, Co., San Jose, CA (US)

( * ) Notice: Subject to any disclaimer, the term of this patent is extended or adjusted under 35 U.S.C. 154(b) by 0 days.

(21) Appl. No.: 13/849,698

(22) Filed: Mar. 25, 2013

(65) Prior Publication Data
US 2014/0289659 A1    Sep. 25, 2014

(51) Int. Cl.
*G06F 3/0488* (2013.01)
*G06F 3/0484* (2013.01)

(52) U.S. Cl.
CPC .......... *G06F 3/0488* (2013.01); *G06F 3/04842* (2013.01)

(58) Field of Classification Search
CPC ..... G06F 3/041; G06F 3/0412; G06F 3/0414; G06F 3/0416; G06F 3/042; G06F 3/0421; G06F 3/0425; G06F 3/0428; G06F 3/043; G06F 3/0433; G06F 3/0436; G06F 3/044; G06F 3/045; G06F 3/046; G06F 3/047; G06F 3/048; G06F 3/0481; G06F 3/0484; G06F 3/04842; G06F 3/04845; G06F 3/04847; G06F 3/0487; G06F 3/03547; G06F 3/0488

USPC .......... 345/173, 174, 175, 176, 177; 178/18.01, 18.02, 18.03, 18.04, 18.05, 178/18.06, 18.07, 18.08, 18.09
See application file for complete search history.

(56) References Cited

U.S. PATENT DOCUMENTS

| | | | |
|---|---|---|---|
| 6,208,330 B1 * | 3/2001 | Hasegawa et al. | 345/173 |
| 6,943,665 B2 * | 9/2005 | Chornenky | 340/5.83 |
| 8,547,357 B2 * | 10/2013 | Aoyagi | 345/173 |
| 2003/0048260 A1 * | 3/2003 | Matusis | 345/173 |

(Continued)

FOREIGN PATENT DOCUMENTS

| WO | 2013/059488 A1 | 4/2013 |
|---|---|---|
| WO | 2014/182435 A1 | 11/2014 |

OTHER PUBLICATIONS

Non-Final Office Action—mailed on Oct. 16, 2014—U.S. Appl. No. 13/780,494, filed Feb. 28, 2013, titled: "Input Tools Having Viobro-Acoustically Distinct Regions and Computing Device for Use With the Same."

(Continued)

*Primary Examiner* — Tom Sheng
(74) *Attorney, Agent, or Firm* — IPV Law Group; David N. Tran

(57) ABSTRACT

A method activates different interactive functions based on a classification of vibro-acoustic signals resulting from touch events with finger parts of a user. A primary function is trigger when an interactive element on a touch screen is touched with a finger tip of the user. An auxiliary function is launched when the interactive element is touched with a knuckle or fingernail of the user. The touch events result in generating the vibro-acoustic signals. The vibro-acoustic signals are classified and used to distinguish what finger part was used based on the classification of the vibro-acoustic signals.

34 Claims, 14 Drawing Sheets

(56) References Cited

U.S. PATENT DOCUMENTS

| | | | |
|---|---|---|---|
| 2008/0158185 A1* | 7/2008 | Westerman | 345/173 |
| 2010/0036967 A1* | 2/2010 | Caine et al. | 709/236 |
| 2010/0123666 A1* | 5/2010 | Wickholm et al. | 345/173 |
| 2010/0127997 A1* | 5/2010 | Park et al. | 345/173 |
| 2010/0279738 A1* | 11/2010 | Kim et al. | 455/566 |
| 2011/0003550 A1* | 1/2011 | Klinghult et al. | 455/41.3 |
| 2011/0248927 A1* | 10/2011 | Michaelis et al. | 345/173 |
| 2012/0019562 A1* | 1/2012 | Park et al. | 345/657 |
| 2012/0120000 A1* | 5/2012 | Lucic et al. | 345/173 |
| 2013/0257757 A1* | 10/2013 | Kim | 345/173 |
| 2013/0285942 A1* | 10/2013 | Ko | 345/173 |
| 2013/0287273 A1* | 10/2013 | Huang | 382/124 |
| 2014/0009401 A1* | 1/2014 | Bajaj et al. | 345/173 |
| 2014/0109004 A1* | 4/2014 | Sadhvani et al. | 715/810 |
| 2014/0210788 A1 | 7/2014 | Harrison et al. | |
| 2014/0240295 A1 | 8/2014 | Harrison | |
| 2014/0289659 A1* | 9/2014 | Harrison et al. | 715/765 |
| 2014/0327626 A1 | 11/2014 | Harrison et al. | |

OTHER PUBLICATIONS

U.S. Appl. No. 13/958,427, filed Aug. 2, 2013, titled: "Capture of Vibro-Acoustic Data Used to Determine Touch Types."

U.S. Appl. No. 14/191,329, filed Feb. 26, 2014, titled: "Using Capacitive Images for Touch Type Classification."

U.S. Appl. No. 13/887,711, filed May 6, 2013, titled: "Using Finger Touch Types to Interact with Electronic Devices."

U.S. Appl. No. 14/483,150, filed Sep. 11, 2014, titled: "Method and Apparatus for Differentiating Touch Screen Users Based on Touch Event Analysis."

U.S. Appl. No. 14/492,604, filed Sep. 22, 2014, titled: "Method and Apparatus for Improving Accuracy of Touch Screen Event Analysis by Use of Edge Classification."

U.S. Appl. No. 14/495,041, filed Sep. 24, 2014, titled: "Method for Improving Accuracy of Touch Screen Event Analysis by Use of Spatiotemporal Touch Patterns."

U.S. Appl. No. 14/242,127, filed Apr. 1, 2014, titled: "Method and Apparatus for Classifying Touch Events on a Touch Sensitive Surface."

International Search Report and Written Opinion received for PCT Application No. PCT/US2014/049485 mailed on Nov. 17, 2014, 13 pages.

International Search Report and Written Opinion received for PCT Application No. PCT/US2014/34977 mailed on Sep. 18, 2014, 12 pages.

International Search Report and Written Opinion received for PCT Application No. PCT/US2012/060865 mailed on Mar. 29, 2013, 10 pages.

* cited by examiner

METHOD AND SYSTEM FOR ACTIVATING DIFFERENT INTERACTIVE FUNCTIONS USING DIFFERENT TYPES OF FINGER CONTACTS

TECHNICAL FIELD

The present invention relates to finger touches for activating different interactive functions; and more particularly, to a method and system for activating different interactive functions based on a classification of vibro-acoustic signals resulting from touch events with finger parts of a user.

BACKGROUND ART

Many technologies exist that have the ability to digitize different types of input. There are two main touch sensing approaches: active and passive. The key downside of active approaches is that an explicit object must be used (e.g., a special pen), which is implemented with electronics (and potentially batteries). For example, pens augmented with infrared light emitters on their tips can be used on the commercially available Microsoft Surface. There have also been efforts to move beyond pens, including, e.g., infrared-light-emitting brushes for painting applications. Current systems generally do not attempt to discriminate among different pens (just perhaps pen from finger input). Variably-modulated infrared light enables identification, but requires specialized hardware. Additionally, ultrasonics can be used for input localization, and can provide pen ID as well. Capacitive coupling allows users or objects to be localized and identified, though this typically requires grounding plates or a physical connection to function.

Sensing based on electromagnetic resonance, another method, operates between active and passive. Although the tools and tangibles need not be powered, they contain a resonant coil that is excited by proximate EM fields, generated by the specialized tablet they operate on. It is also possible to support object identification through a combination of RFID and vision processing, which offers greater scalability.

Fiducial markers are a truly passive approach. They provide the ID of an object through a uniquely patterned tag—often in a sticker form factor. This method has been shown to be very capable—the only major drawback is the size of the marker, which in general, prevents placement on small surfaces like the tip of a pen. Fiducial markers can also work in a capacitive-sensing manner, allowing tags to be embedded in an object. Additionally, the shape of an object can be captured optically and used for classification (e.g., mice and keyboards).

In general, the aforementioned techniques require instrumentation of the object providing input, which is problematic for fingers (i.e., people do not like to wear things on their fingers and hands). Researchers have also looked at wrist-mounted acoustic sensors that can classify finger-on-finger actions, such as pinching or flicking Finger taps can also be localized on the body through acoustic fingerprinting.

However, the latter systems require sensors to be placed on the user. Without instrumentation, some areas of the finger can be determined through computer vision (e.g., pad vs. tip). Using accelerometers or acoustics, soft and hard taps can be discriminated.

Contemporary interactive surfaces generally treat finger touches as a single class of input (a partial exception to this are finger-print scanning systems, which can capture a high-resolution fingerprint image to infer the 3D "posture" of a finger; also, area of contact via optical or capacitive sensing can be considered an extra input dimension). However, this is a gross simplification—fingers are diverse appendages, both in their motor capabilities and their anatomical composition. Supporting additional dimensions of finger input have largely been ignored because instrumenting the user with active or passive components is invasive.

At present, in order for a finger to perform different operations at a single point in space on a touch screen, it must be overloaded. Most common is a tap-and-hold period, or chording of the fingers (e.g., two-finger-tap for right click). This can trigger a transient contextual menu, which allows a user to select one of several actions. An alternative to finger overloading is breaking function out into one or more buttons. For example, there is a scheme in which one button is for minimizing a window and another button is for closing it. However, this is problematic for mobile devices with limited screen real estate.

Currently, touch screens do not distinguish between different types of finger contacts. For example, touching with the tip of the finger and touching with the knuckle are treated the same. As such, all finger touches have the same interactive outcome.

SUMMARY

In view of the above, the present invention provides a method and system for activating different interactive functions based on a classification of vibro-acoustic signals.

In accordance with an aspect of the present invention, there is provided a method for activating different interactive functions, the method including:

triggering a primary function related to an interactive element on a touch screen when a user interacts with the interactive element using any one of finger parts of the user; and launching an auxiliary function related to the interactive element when the user interacts with the interactive element using another one of the finger parts of the user.

In accordance with another aspect of the present invention, there is provided a computing system, which includes:

a touch screen configured to display interactive elements;

a touch event detector configured to detect touch events in which the interactive element is touched by different parts of a finger of a user, wherein the touch events result in generating unique vibro-acoustic signals; and a vibro-acoustic classifier configured to classify the vibro-acoustic signals and allow the computing system to selectively activate a primary function or an auxiliary function related to the interactive element depending on the classified vibro-acoustic signals.

BRIEF DESCRIPTION OF THE DRAWINGS

The above and other objects and features of the present invention will become apparent from the following description of an exemplary embodiment given in conjunction with the accompanying drawings, in which.

DETAILED DESCRIPTION

The advantages and features of exemplary embodiments and methods of accomplishing these will be clearly understood from the following embodiments taken in conjunction with the accompanying drawings. However, the exemplary embodiments are not limited and may be implemented in various forms. It should be noted that the exemplary embodiments are provided to make a full disclosure and also to allow those skilled in the art to understand the full range of the exemplary embodiments. Therefore, the exemplary embodiments are to be defined only by the scope of the appended claims.

FIGS. 1A to 4B are exemplary diagrams illustrating a concept of activating different interactive functions based on a classification of vibro-acoustic signals in accordance with an exemplary embodiment of the present invention;

In brief, the concept of the present invention may be described as follow. A user touches or contacts a touch screen with one of the finger parts, e.g., a finger tip. Such a touch event triggers a primary or conventional functionality, such as opening a file, dragging a file, launching an application, selecting a song, pressing a button, and the like. When a user touches the touch screen with another one of the finger parts, e.g., a knuckle or fingernail, an auxiliary function is launched on the same touch screen.

Although one or more exemplary embodiments explain and illustrate that a finger tip causes to activate a primary function and a knuckle or fingernail causes to activate an auxiliary function, the embodiments do not limit thereto. It should be noted that different combination of these finger parts or the use of other finger parts can also activate the primary and auxiliary functions.

Figure 1A:
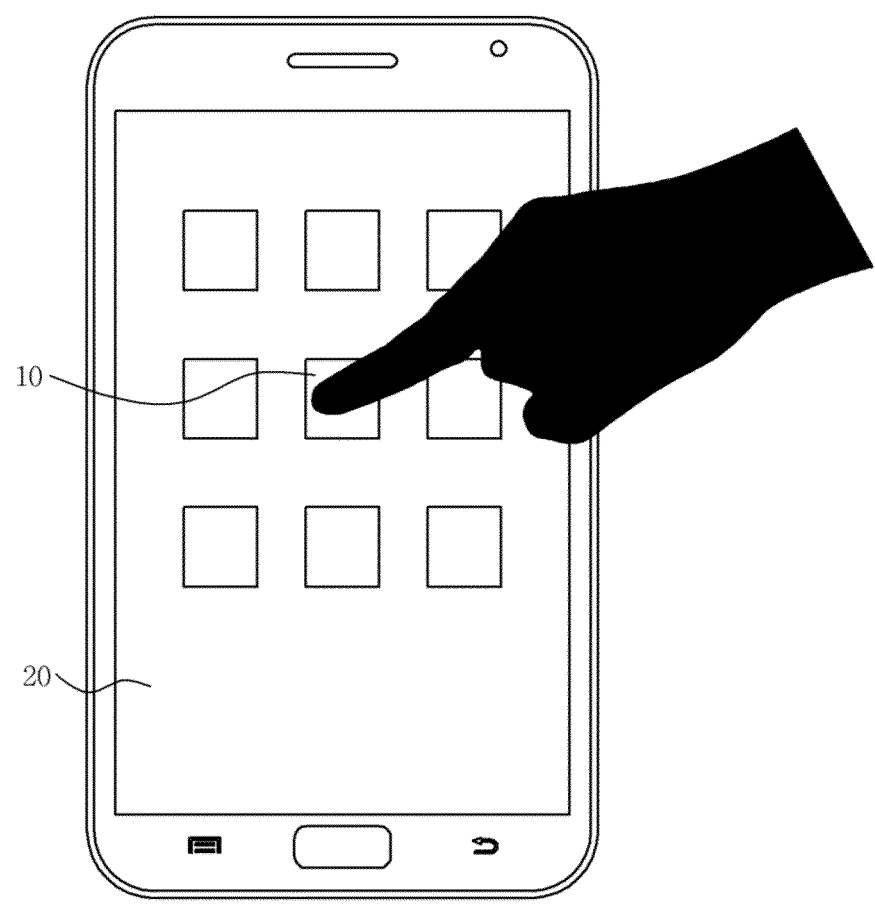
FIGS. 1A to 4B are exemplary diagrams illustrating a concept of activating different interactive functions based on a classification of vibro-acoustic signals in accordance with an exemplary embodiment of the present invention.

First, FIG. 1A illustrates one exemplary diagram that a finger tip is used to trigger a primary or conventional function.

As shown in FIG. 1A, when a user touches an interactive element 10 on a touch screen 20 with a finger tip, a primary or conventional function is triggered. The term of "interactive element" used herein may refer to a user interface such as an icon or a graphical object representing applications or services designed to activate a specific function related thereto. The specific function, for example, may include such actions opening, dragging, launching, selecting, or pressing a photo, a file, a text, an image, an application, a song, a button, a game, an in-game character or the like through the use of the applications or services.

Figure 1B:
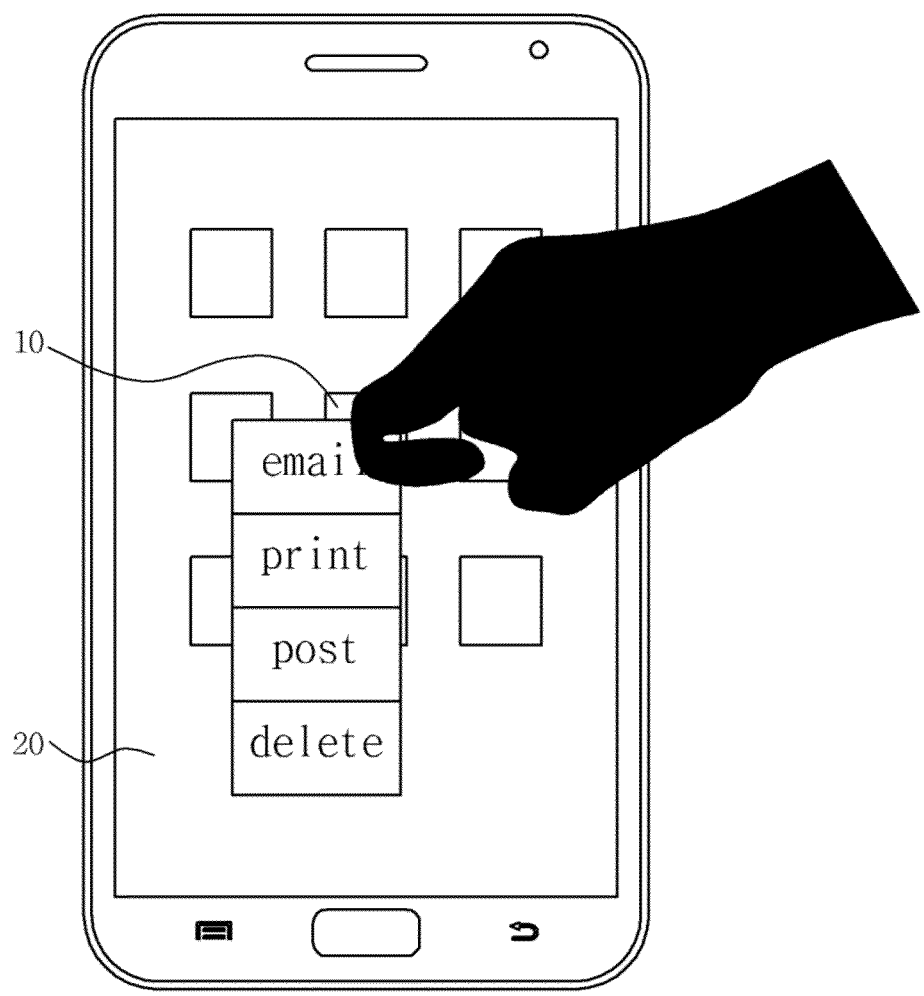
Figure 1C:
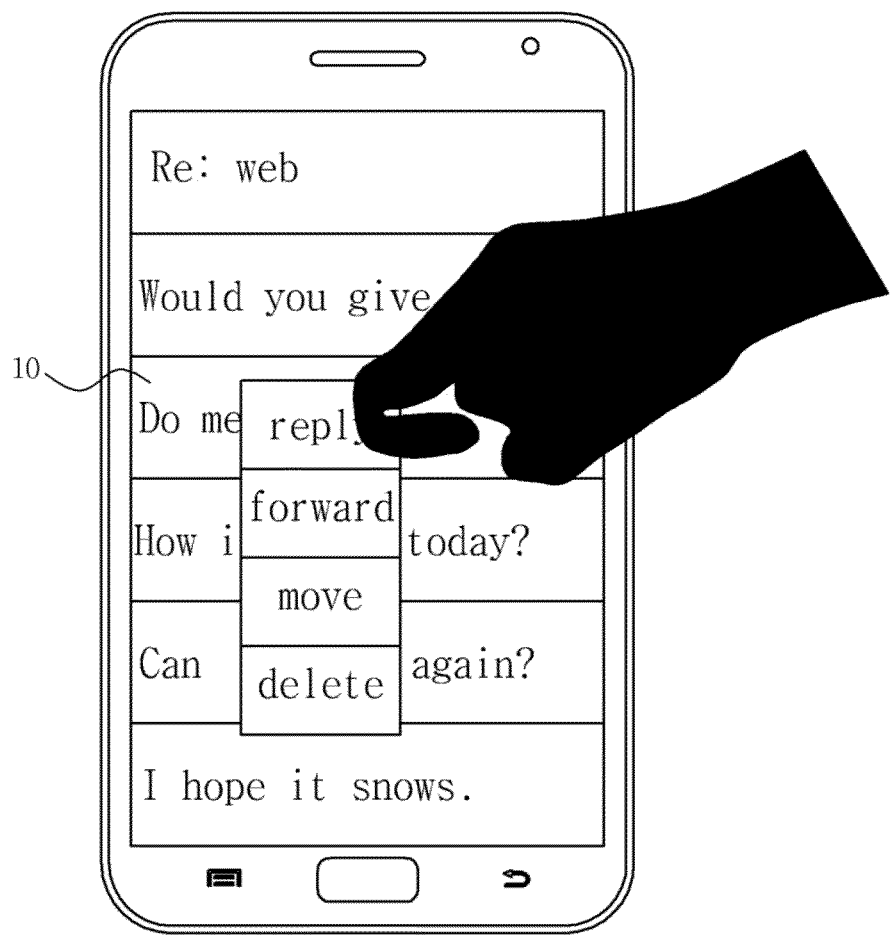

FIGS. 1B and 1C illustrate exemplary diagrams that a knuckle or fingernail is used to activate an auxiliary function such as a pop-up of context menus.

Referring to FIG. 1B, a finger tip may be used to scroll (i.e., translate a display window) as seen in contemporary touch interfaces. When a knuckle or fingernail touches an interactive element 10 on a touch screen 20, e.g., a photo, a contextual pop-up menu could appear with the following options: email, print, post, delete and the like. As another example, as shown in FIG. 1C, when a knuckle or fingernail touches an interactive element 10, e.g., an opened email, a context menu could appear with the following options: reply, forward, move, delete, and the like.

Figure 2A:
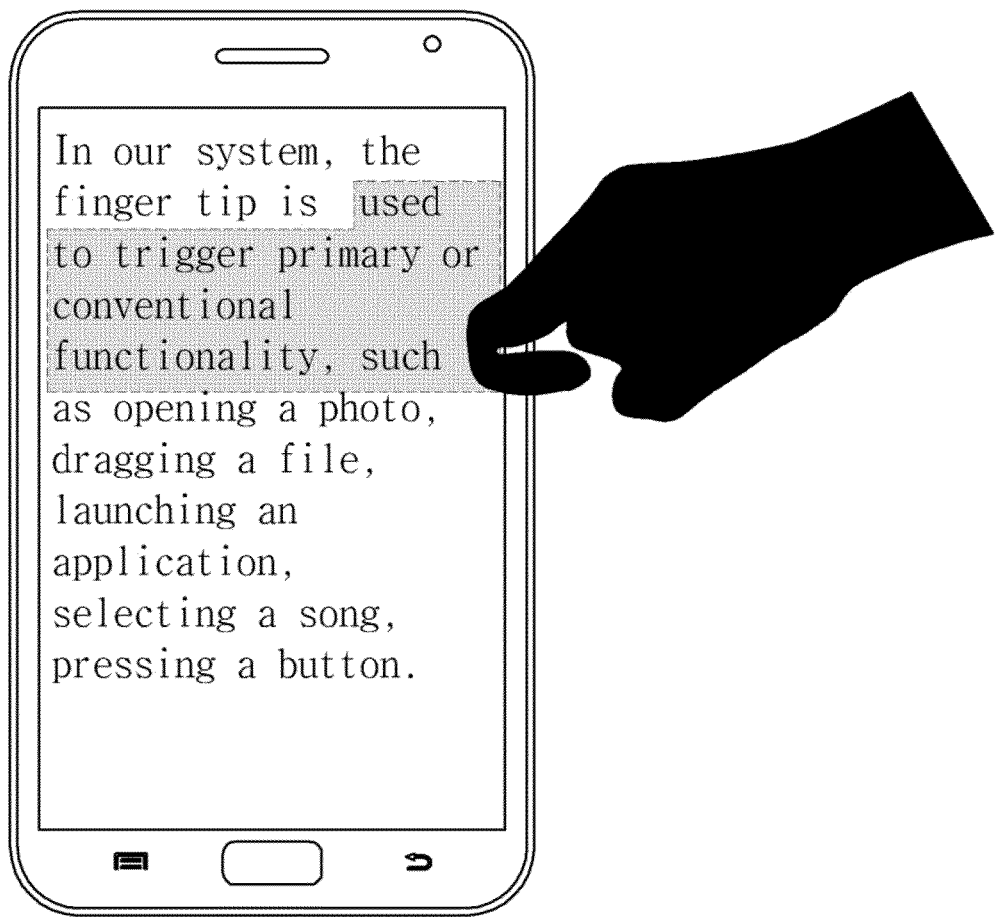
Figure 2B:
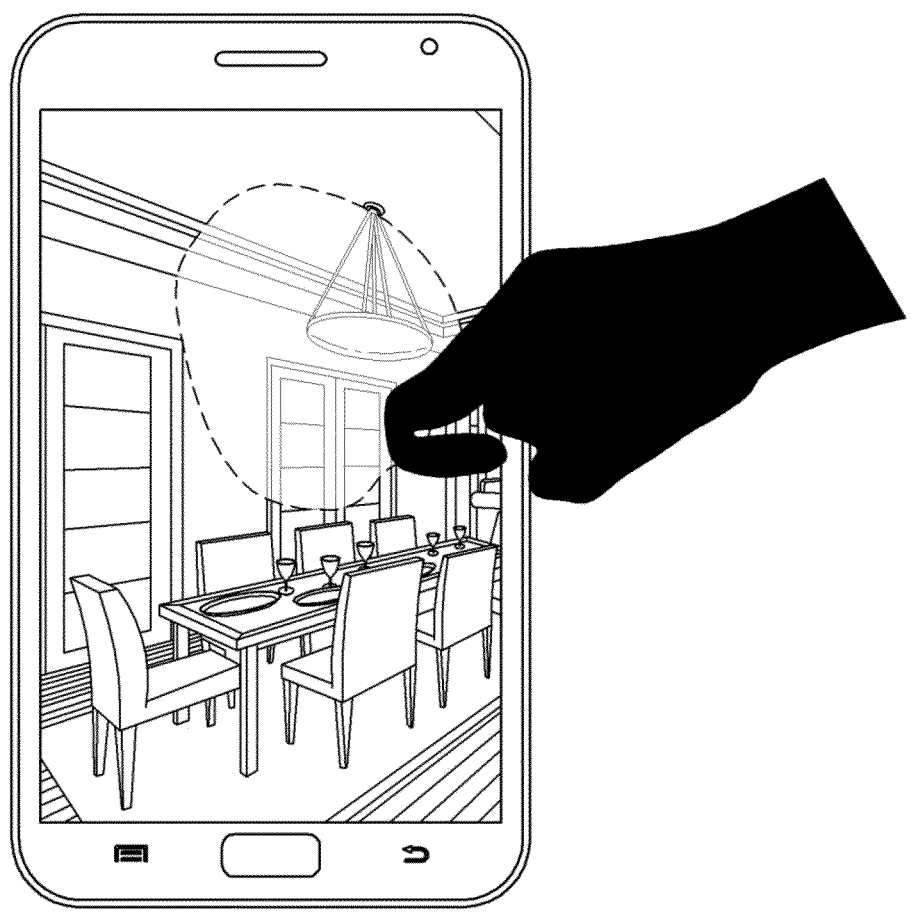
Figure 2C:
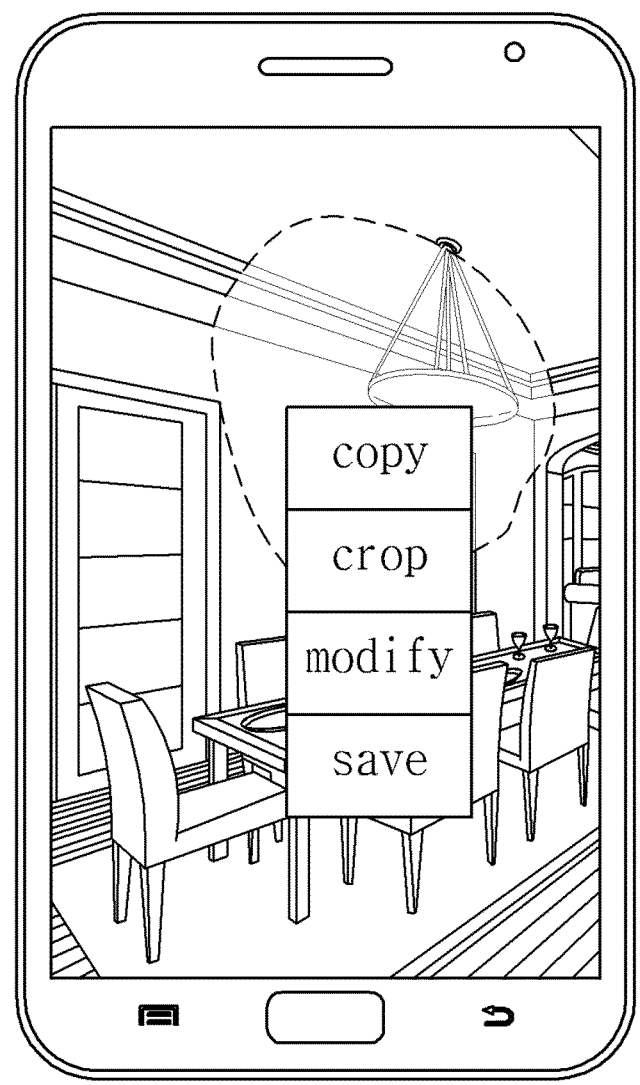

FIGS. 2A, 2B and 2C illustrate exemplary diagrams that the knuckle or fingernail can be used for interactions requiring selection.

In FIG. 2A, one exemplary embodiment includes a selection of text. A finger tip may be used to scroll (i.e., translate a display window) as seen in contemporary touch interfaces. Using a knuckle or fingernail, a user may touch and drag over a region of text to select the text. As another example, using a knuckle or fingernail, a user may touch and drag over a region of text to paint the text in a special color (e.g., a highlighting tool).

In FIG. 2B, using a knuckle or fingernail, a user may touch and drag over a region of an image to lasso select an arbitrary shaped sub-region of the image or a user may touch and drag over a region of an image to select a rectangular sub-region of the image. Finally, upon completion of this selection action, a context menu could automatically appear. For example, as illustrated in FIG. 2C, following an image region selection, a context menu could appear with the following options: copy, crop, modify, save, etc. As another example, following a text selection, a context menu could appear with the following options: copy, cut, paste, search, delete, etc.

Figure 3A:
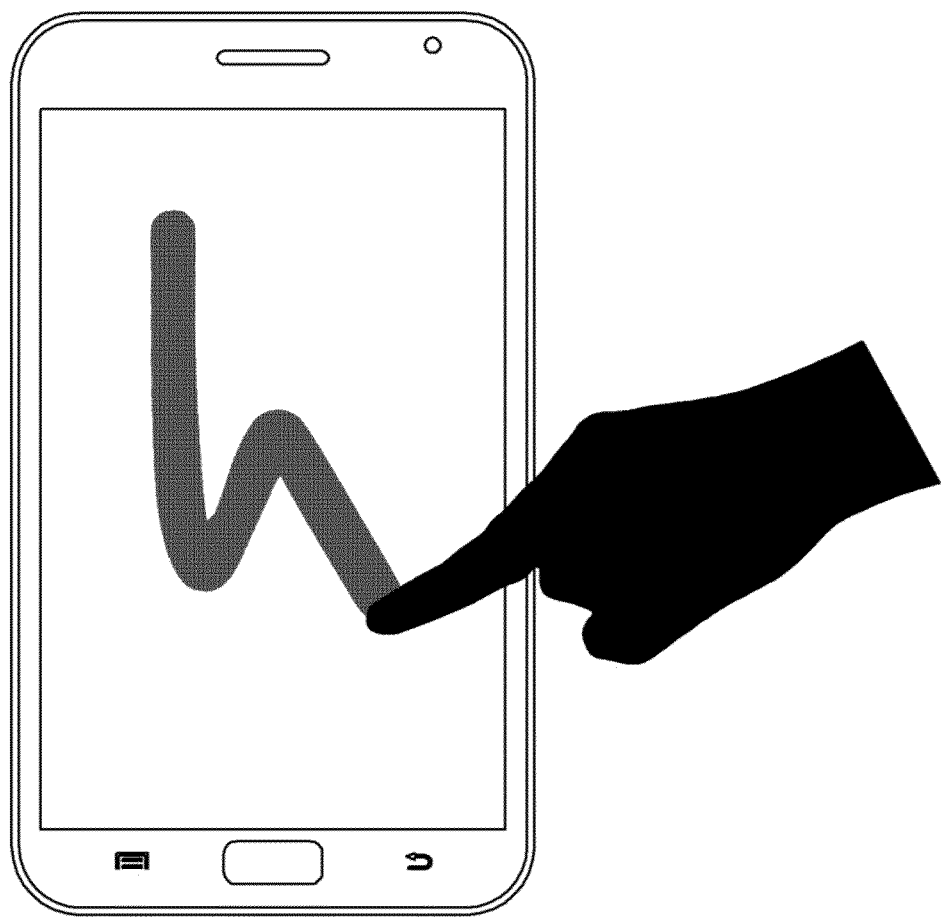
Figure 3B:
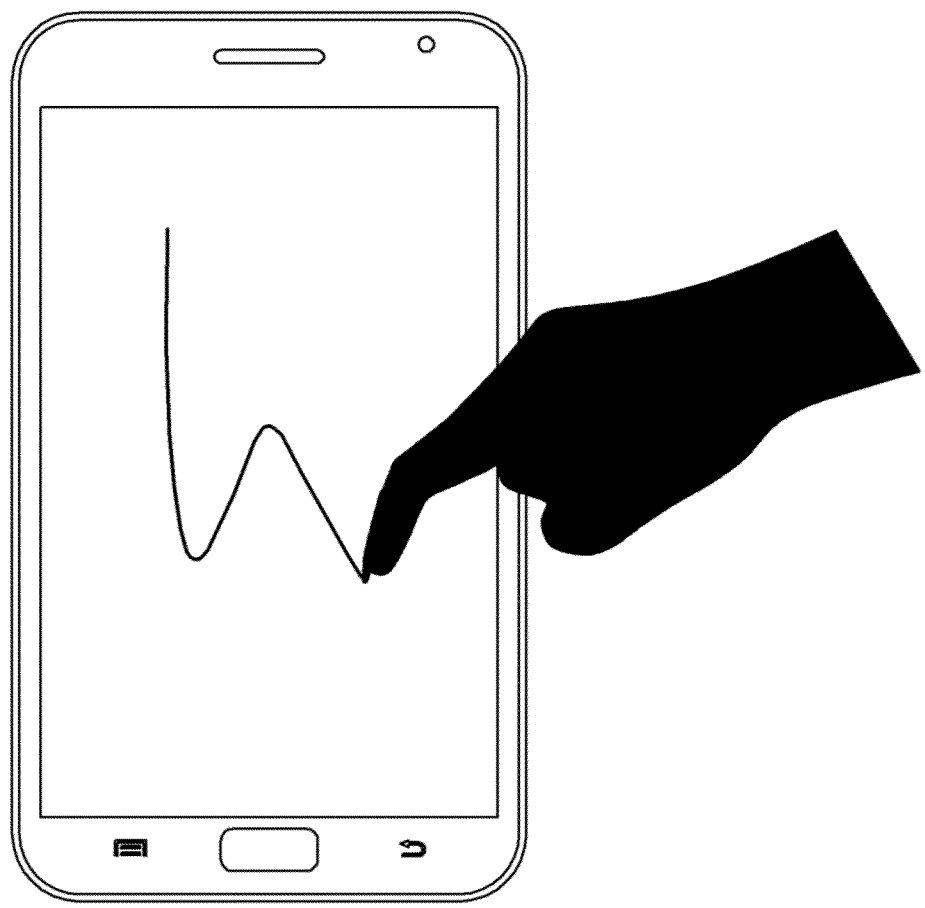
Figure 3C:
Figure 3D:
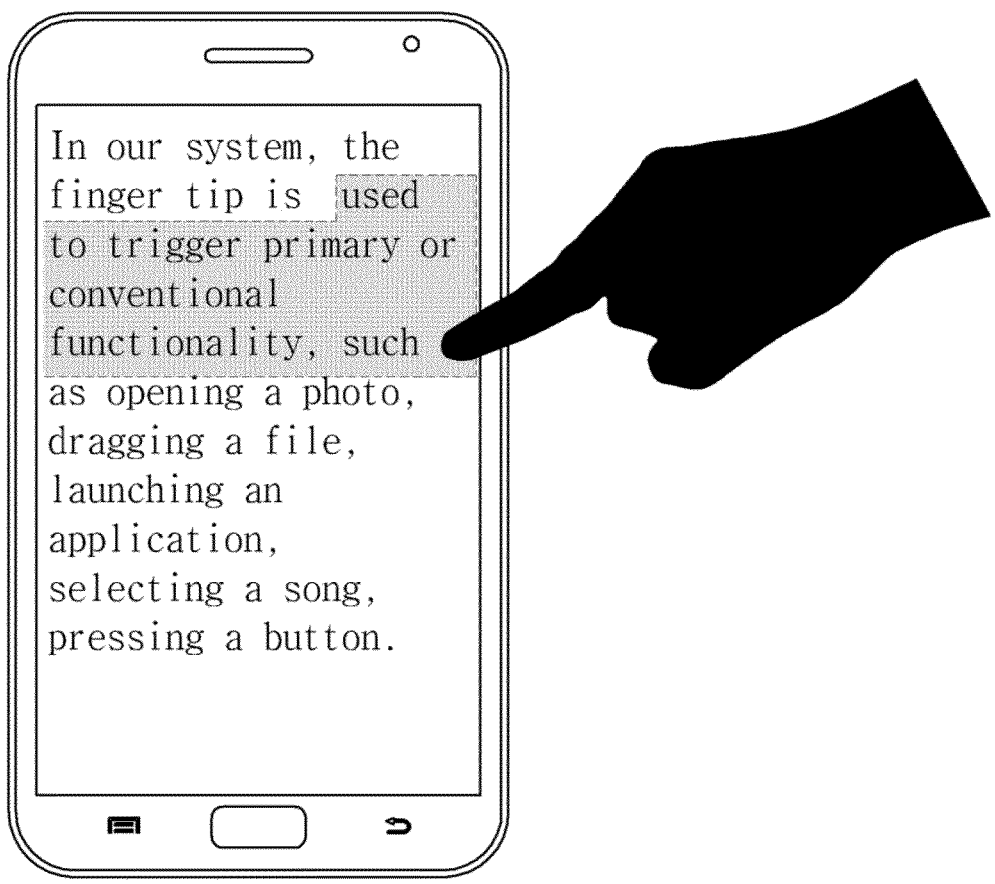
Figure 3E:

FIGS. 3A to 3E illustrate exemplary diagrams in which touches with the finger tip, knuckle and fingernail are used for different drawing actions in a drawing mode. In exemplary embodiment, the finger parts of the user are used as tools for different drawing actions in the drawing mode. For example, the finger tip may be used as a thick brush, the fingernail or knuckle as a fine marker, and the knuckle for erasing, as illustrated in FIGS. 3A, 3B, and 3C, respectively. Another exemplary configuration includes using the finger tip as a marker for highlighting the selected text region and the knuckle for smudging, as illustrated in FIGS. 3D and 3E, respectively.

Figure 4A:
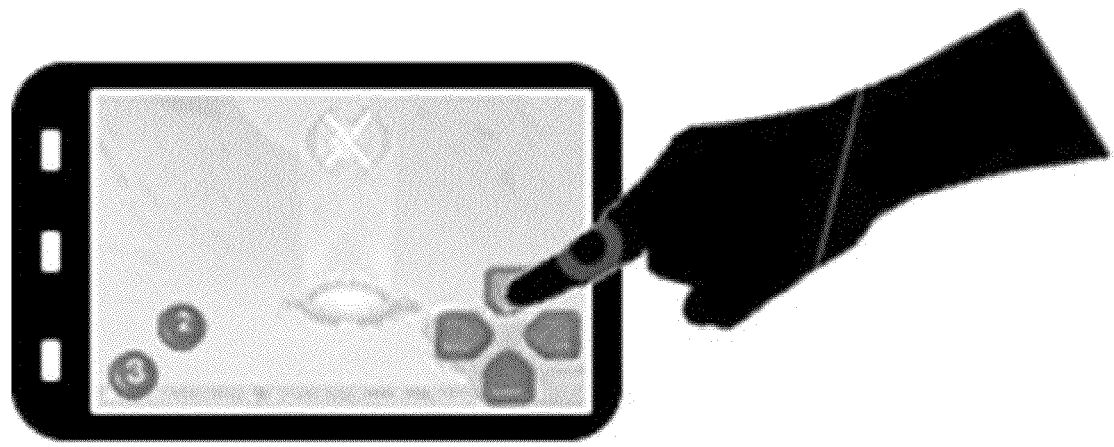
Figure 4B:

FIGS. 4A and 4B illustrate exemplary diagrams that the touches with the knuckle and fingernail can be used for auxiliary actions in games in concert with finger tip driven interactions.

As illustrated in FIG. 4A, using an onscreen movement control (e.g., virtual joy stick or arrow pad), a finger tip may be used for regular in-game character (i.e., player) movement. If a knuckle or fingernail is used, as illustrated in FIG. 4B, the directional player movement may be performed in a crouched position. As another example, a finger tip may be used for a primary weapon fire and a knuckle or fingernail for alternative weapon mode. Also, a touch with a fingernail may be used to run. In addition, a momentary tap of the knuckle or fingernail (i.e., a tap) may be used to jump an in-game character.

Figure 5:
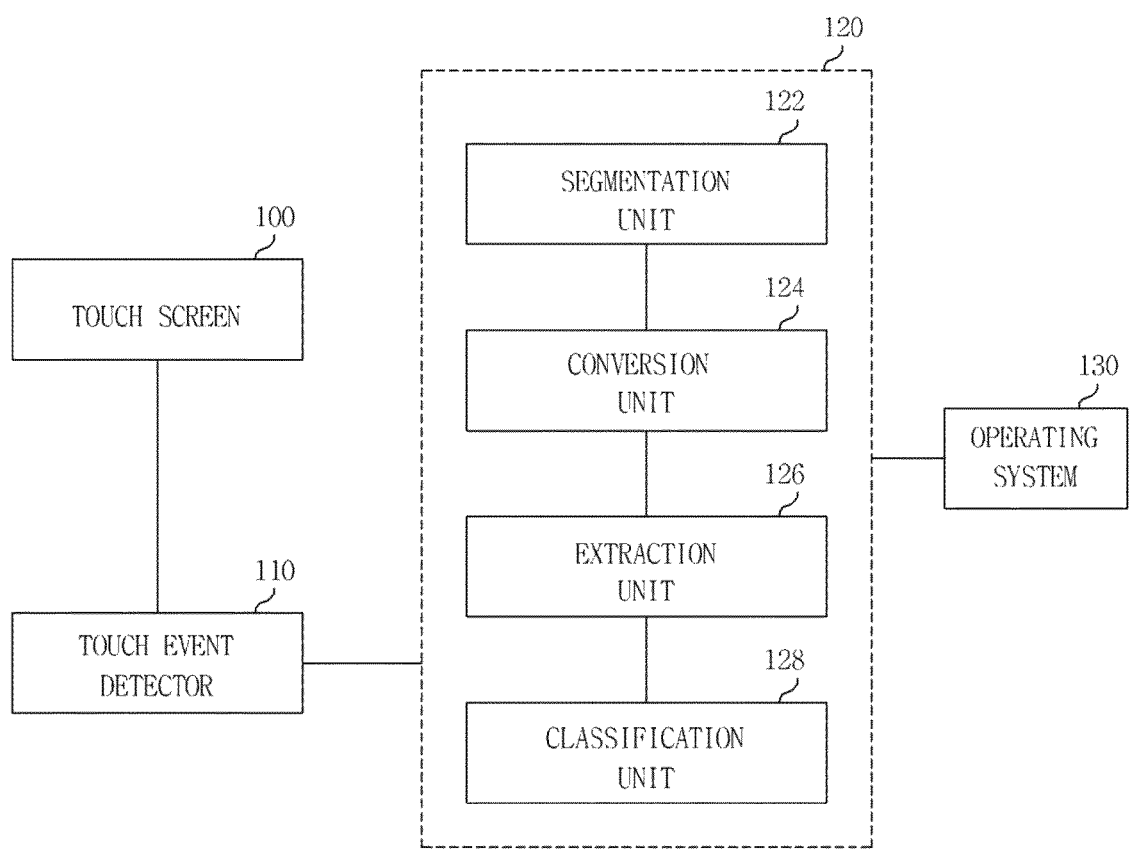
FIG. 5 is a block diagram of a computing system for activating different interactive functions based on a classification of vibro-acoustic signals in accordance with an exemplary embodiment of the present invention.

FIG. 5 is a block diagram of a computing system for distinguishing different interactive functions based on a classification of vibro-acoustic signals in accordance with an embodiment of the present invention.

The computing system of the embodiment may have an operating system (OS), and can run various types of services or applications, known as apps. The computing system may also be equipped with a telecommunication capability that can allow connections to communication network. Such a computing system may include, but not limited to, a table top computer (e.g., Surface Computing), laptop computer, desktop computer, mobile computer, mobile internet device, mobile phone, smart-phone, PDA (Personal Digital Assistant), game console, portable media player, and the like.

Referring to FIG. 5, the computing system includes a touch screen 100, a touch event detector 110, a vibro-acoustic classifier 120, and an OS 130.

Figure 6:
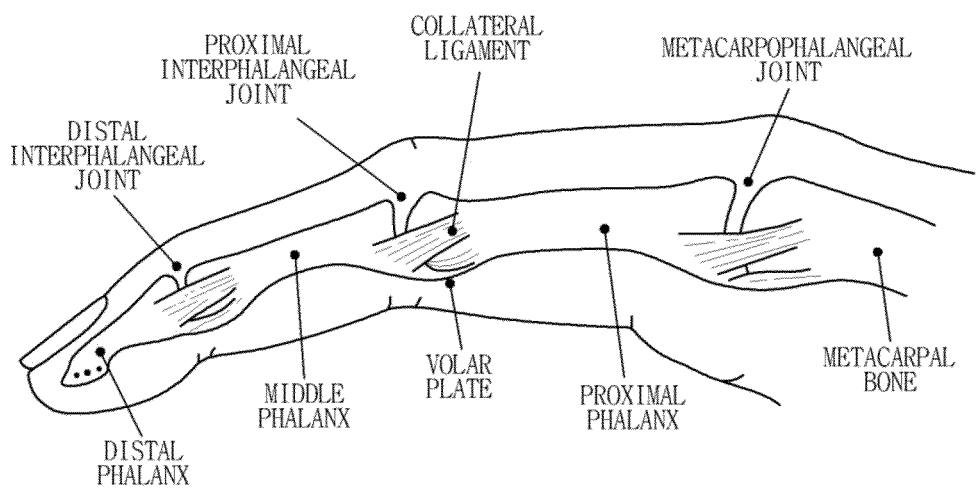
FIG. 6 illustrates an anatomical chart of finger parts for use in interacting with the computing system in accordance with an exemplary embodiment of the present invention.

The touch screen 100 is an electronic visual display and serves also an input/output device supplementing or substituted for a keyboard, a mouse, and/or other types of devices. The touch screen 100 displays one or more interactive elements such as graphical representation for services or applications designed to perform a specific function on the computing system. Touching the interactive elements with the finger parts of a user, beyond the conventional tip of the finger, causes the OS 130 to activate the application or service related to the interactive elements. As shown in FIG. 6, fingers are diverse appendages, both in their motor capabilities and their anatomical compositions. A single digit contains different parts such as one or more knuckles, a tip, pad, and fingernail.

The finger tip includes the fleshy mass on the palmar aspect of the extremity of the finger, as well as the finger sides up to the distal interphalangeal articulation. It also includes the very tip of the finger (i.e., the distal tip of the distal phalanx). However, the fingernail may not be included in an embodiment as part of finger tip definition, as this is an anatomically distinct feature and region.

The fingernail encompasses all parts of the keratin (or artificial nail material), horn-like envelope covering the dorsal aspect of the terminal phalanges of fingers.

The knuckle includes the immediate areas surrounding the boney joints of human fingers, including joints on the thumb, and both major and minor knuckles. Specifically, the boney regions are within a 1 cm radius surrounding the metacarpophalangeal joints and interphalangeal articulations.

Figure 7:
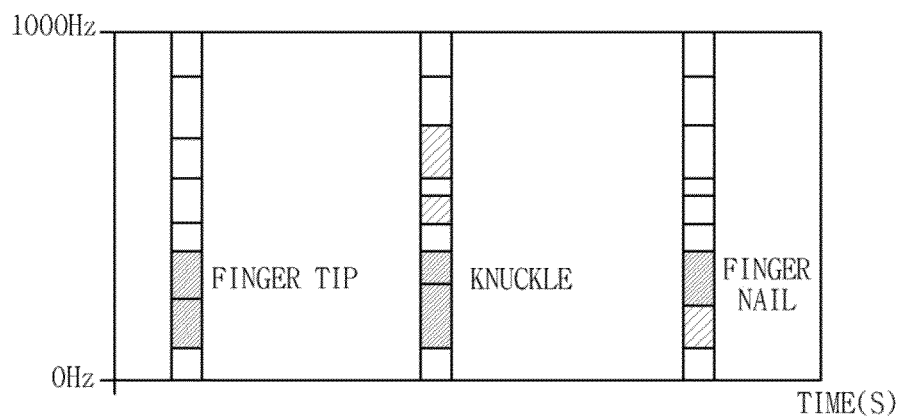
FIG. 7 shows a spectrogram of finger parts in accordance with an exemplary embodiment of the present invention.

When an object strikes a certain material, vibro-acoustic waves propagate outward through the material or along the surface of the material. Typically, interactive surfaces use rigid materials, such as plastic or glass, which both quickly distribute and faithfully preserve the signal. As such, when respective finger parts touch or contact the surface of the touch screen 100, vibro-acoustic responses are produced. The vibro-acoustic characteristics of the respective finger parts are unique, mirroring their unique anatomical compositions. For example, FIG. 7 illustrates a spectrogram of three types of the finger contact. As known from FIG. 7, the finger parts, that is, a finger tip, a knuckle, and a fingernail, produce different vibro-acoustic responses.

When a user wants to use an application or a service on the computing system, the user may touch an interactive element for the application or service with a finger part such as a finger tip, knuckle, or fingernail. Such a touch event results in the generation of a unique vibro-acoustic signal from the surface of the touch screen 100.

Referring back to FIG. 5, the touch event detector 110 detects the touch event entailing the vibro-acoustic signal. The touch event detector 110, for example, may be arranged at a rear side of the touch screen so that the vibro-acoustic signal caused by the touch event can be captured. The touch event detector 110 can be triggered by the onset of the vibro-acoustic signal resulting from the touch event. To capture the touch event and subsequent vibro-acoustic signal, the touch event detector 110 may include one or more impact sensors, vibration sensors, accelerometers, strain gauges, or acoustic sensors such as a condenser microphone, a piezoelectric microphone, MEMS microphone and the like. Once the vibro-acoustic signal has been captured by the touch event detector 110, the vibro-acoustic classifier 120 processes the vibro-acoustic signal to distinguish which finger part was used.

The OS 130 runs the computing system so that the primary function or the auxiliary function can be activated in line with the classification of the vibro-acoustic signals.

The vibro-acoustic classifier 120 includes a segmentation unit 122 to segment the vibro-acoustic signal into a digital representation; a conversion unit 124 to convert the digitized vibro-acoustic signal into an electrical signal; a feature extraction unit 126 derive a series of features from the electrical signal; and a classification unit 128 to classify the finger part using the features to distinguish what finger part was used for the touch event.

The segmentation unit 122 samples the vibro-acoustic signal, for example, at a sampling rate of 96 kHz, using a sliding window of 4096 samples of the vibro-acoustic signal.

The conversion unit 124 then performs, for example, a Fourier Transform on sampled time-dependent vibro-acoustic signal to produce an electrical signal having frequency domain representation. For example, the Fourier Transform of this window may produce 2048 bands of frequency power.

The vibro-acoustic classifier 120 may further down-sample this data into additional vectors (i.e., buckets of ten), providing a different aliasing. In addition, additional time-domain features may be calculated from the vibro-acoustic signal, such as the average absolute amplitude, total absolute amplitude, standard deviation of the absolute amplitude, the center of mass for both the segmented input signal and the Fourier Transformed signal, and zero crossings.

The feature extraction unit 126 may also calculate a series of features from the frequency domain representation of the vibro-acoustic signals, such as the fundamental frequency of the impact waveform.

The classification unit 128 classifies the vibro-acoustic signal using the features to distinguish what finger part was used to generate the touch event, so that the computing system to selectively activate a primary function or an auxiliary function related to the interactive element depending on the classified vibro-acoustic signals.

To aid classification, the user can provide supplemental training samples to the vibro-acoustic classifier 120.

In one exemplary embodiment, the classification unit 128 may be implemented with a support vector machine (SVM) for feature classification. The SVM is a supervised learning model with associated learning algorithms that analyze data and recognize patterns, used for classification and regression analysis.

While the present invention has been shown and described with respect to the exemplary embodiments, the present invention is not limited thereto. It will be understood by those skilled in the art that various changes and modifications may be made without departing from the scope of the present invention as defined in the following claims.

What is claimed is:

1. A method for activating different interactive functions, the method comprising:
    triggering a first function related to an interactive element on a touch screen when a user interacts with the interactive element using a first finger part of a plurality of finger parts of the user, wherein the plurality of finger parts include a fingertip, a knuckle and fingernail; and
    triggering a second function related to the interactive element when the user interacts with the interactive element using a second finger part of the plurality of finger parts of the user.

2. The method of claim 1, wherein the the first function is a primary function, and wherein the second function is an auxiliary function.

3. The method of claim 1, wherein said first finger part is a fingertip.

4. The method of claim 1, wherein said second finger part is a knuckle or fingernail.

5. The method of claim 1, further comprising:
    capturing touch events based on touches caused by the finger parts of the user, wherein the touch events result in generating unique vibro-acoustic signals;
    distinguishing what finger part was used for the touches using the vibro-acoustic signals; and
    selectively activating the first function or the second function upon distinguishing the finger parts.

6. The method of claim 5, wherein said distinguishing what finger part was used comprises:
   classifying the vibro-acoustic signals to detect the finger parts used to touch the interactive element.

7. The method of claim 1, wherein the interactive element is an email and a touch of the email with the second finger part of the user causes a context menu to appear with an additional option.

8. The method of claim 7, wherein the additional option comprises reply, reply all, forward, print, archive, delete or any combination thereof.

9. The method of claim 1, wherein the interactive element is a photo and a touch of the photo with the second finger part of the user causes a context menu to appear with an additional option.

10. The method of claim 9, wherein the additional option comprises email, print, modify, duplicate, post to web, delete or any combination thereof.

11. The method of claim 1, wherein the interactive element is a text and a touch and drag over a region of the text with the second finger part of the user causes selection of the text.

12. The method of claim 11, further comprising:
   making an appearance of a context menu with an additional option following the selection, wherein the additional option comprises copy, cut, paste, delete or any combination thereof.

13. The method of claim 1, wherein the interactive element is a text and a touch and drag over a region of the text with the second finger part of the user causes highlighting the text.

14. The method of claim 1, wherein the interactive element is an image and a touch and drag over a region of the image with the second finger part of the user causes selecting a sub-region of the image.

15. The method of claim 14, further comprising:
   making an appearance of a context menu with an additional option following the selection, wherein the additional option comprises copy, crop, modify, save, or any combination thereof.

16. The method of claim 1, wherein the interactive element is an image and a touch and drag over a region of the image with the second finger part of the user causes lasso selecting the image.

17. The method of claim 16, further comprising:
   making an appearance of a context menu with an additional option following the selection, wherein the additional option comprises copy, crop, modify, save, or any combination thereof.

18. The method of claim 1, wherein the finger parts of the user are used as tools for different drawing actions in a drawing mode.

19. The method of claim 18, wherein the fingertip is used as a thick brush in the drawing mode.

20. The method of claim 18, wherein the knuckle is used as a fine marker in the drawing mode.

21. The method of claim 18, wherein the fingertip is used as a highlighter marker in the drawing mode.

22. The method of claim 18, wherein the knuckle is used for erasing in the drawing mode.

23. The method of claim 1, wherein the finger parts of the user are used as onscreen movement controls in a game.

24. The method of claim 23, wherein the fingertip is used for a regular player movement.

25. The method of claim 23, wherein the knuckle is used for a directional player movement in a crouched position.

26. The method of claim 23, wherein the fingernail is used to run an in-game character.

27. The method of claim 23, wherein the fingernail is used to jump an in-game character.

28. The method of claim 1, wherein the finger parts of the user are used for auxiliary actions in a game in concert with each other.

29. The method of claim 28, wherein the fingernail is used for primary weapon fire and the knuckle or fingernail is used for alternative weapon mode.

30. A computing system comprising:
   a touch screen configured to display an interactive element;
   a touch event detector configured to detect touch events by finger parts based on the interactive element being touched by a first or a second finger part of a plurality of finger parts of a user, wherein the touch events result in generating vibro-acoustic signals; and
   a vibro-acoustic classifier configured to classify the vibro-acoustic signals and allow the computing system to selectively activate a first function or a second function related to the interactive element depending on the classified vibro-acoustic signals.

31. The computing system of claim 30, the vibro-acoustic classifier distinguishes which finger parts touched the interactive element based on the classification of the vibro-acoustic signals.

32. The computing system of claim 30, wherein the plurality of finger parts include a fingertip, a knuckle and fingernail.

33. The computing system of claim 30, wherein said first finger part is a fingertip.

34. The computing system of claim 30, wherein said second finger part is a knuckle or fingernail.

* * * * *